United States Patent
Krajca et al.

(10) Patent No.: US 11,951,658 B2
(45) Date of Patent: Apr. 9, 2024

(54) SYSTEMS AND METHODS FOR FORMING COMPOSITE MEMBERS

(71) Applicant: The Boeing Company, Chicago, IL (US)

(72) Inventors: Scott Edward Krajca, Seattle, WA (US); Darrell Darwin Jones, Mill Creek, WA (US); Paul Chace Wilcoxson, Kent, WA (US); Kurtis S. Willden, Kent, WA (US); Long Hoang Ly, Renton, WA (US); Daniel R. Smith, Jr., Woodinville, WA (US); Jeremy Justice, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 253 days.

(21) Appl. No.: 17/394,771

(22) Filed: Aug. 5, 2021

(65) Prior Publication Data
US 2022/0080622 A1    Mar. 17, 2022

Related U.S. Application Data

(60) Provisional application No. 63/078,551, filed on Sep. 15, 2020.

(51) Int. Cl.
| | |
|---|---|
| *B29C 31/08* | (2006.01) |
| *B29C 70/20* | (2006.01) |
| *B29C 70/22* | (2006.01) |
| *B29C 70/38* | (2006.01) |
| *B29C 70/54* | (2006.01) |
| *B29L 9/00* | (2006.01) |

(52) U.S. Cl.
CPC .......... *B29C 31/085* (2013.01); *B29C 70/202* (2013.01); *B29C 70/22* (2013.01); *B29C 70/38* (2013.01); *B29C 70/545* (2013.01); *B29C 2793/0081* (2013.01)

(58) Field of Classification Search
CPC ....... B29C 31/08; B29C 31/085; B29C 70/30; B29C 70/38
See application file for complete search history.

(56) References Cited

U.S. PATENT DOCUMENTS

| | | | |
|---|---|---|---|
| 4,946,551 A | * | 8/1990 | Ishige ................. B29C 31/08 414/790.7 |
| 4,997,510 A | | 3/1991 | Shinno et al. |

(Continued)

FOREIGN PATENT DOCUMENTS

| | | | | |
|---|---|---|---|---|
| EP | 4000841 A1 | * | 5/2022 | |
| EP | 4000887 A1 | * | 5/2022 | |
| WO | WO-2019077369 A1 | * | 4/2019 | ............ B29B 11/16 |

OTHER PUBLICATIONS

EP Search Report dated Jan. 4, 2022 in re EP Application No. 21187142.1.

*Primary Examiner* — Atul P. Khare
(74) *Attorney, Agent, or Firm* — COATS & BENNETT, PLLC

(57) ABSTRACT

Systems and methods for manufacturing a composite member. The system and methods are configured to move different types of composite plies from different supply stations. The composite plies are moved along a conveyance member and then with a transfer station to a forming tool. One or more forming members form the composite plies onto the forming tool.

20 Claims, 17 Drawing Sheets

(56) References Cited

U.S. PATENT DOCUMENTS

| | | | | |
|---|---|---|---|---|
| 5,006,990 | A | 4/1991 | Ward et al. | |
| 5,139,604 | A | 8/1992 | Mitchell | |
| 6,843,565 | B2 | 1/2005 | Evans et al. | |
| 7,013,943 | B2 * | 3/2006 | Sana | B29C 70/545 156/263 |
| 8,752,293 | B2 * | 6/2014 | Jones | B29C 70/304 156/196 |
| 9,387,657 | B2 | 7/2016 | Smith, Jr. et al. | |
| 9,764,918 | B2 | 9/2017 | Hagman et al. | |
| 10,022,949 | B2 * | 7/2018 | Scholes | B29C 70/30 |
| 10,086,596 | B2 | 10/2018 | Desjardien et al. | |
| 10,189,213 | B2 * | 1/2019 | Pause | B29C 70/388 |
| 10,456,960 | B2 | 10/2019 | Chapman et al. | |
| 10,518,516 | B2 | 12/2019 | Pham et al. | |
| 10,926,490 | B2 * | 2/2021 | Petrovski | B29C 70/38 |
| 11,478,956 | B2 * | 10/2022 | Santoni | B29B 11/16 |
| 11,685,128 | B2 * | 6/2023 | Krajca | B29C 70/38 156/540 |
| 2004/0041304 | A1 | 3/2004 | Willden et al. | |
| 2005/0236093 | A1 | 10/2005 | Taggart | |
| 2007/0289699 | A1 | 12/2007 | Benson et al. | |
| 2009/0071592 | A1 | 3/2009 | Benson et al. | |
| 2009/0148647 | A1 | 6/2009 | Jones et al. | |
| 2011/0277918 | A1 | 11/2011 | Lee et al. | |
| 2012/0269999 | A1 * | 10/2012 | Kind | B29C 31/085 296/202 |
| 2013/0306233 | A1 * | 11/2013 | Pini | B29B 11/16 156/256 |
| 2016/0354951 | A1 * | 12/2016 | Mai | B29C 70/545 |
| 2016/0368226 | A1 * | 12/2016 | Encinosa | B29C 70/38 |
| 2018/0304606 | A1 | 10/2018 | Rotter et al. | |
| 2020/0031019 | A1 | 1/2020 | Bold | |
| 2021/0107182 | A1 | 4/2021 | Hopkins et al. | |
| 2021/0107241 | A1 | 4/2021 | Hopkins et al. | |
| 2021/0107242 | A1 | 4/2021 | Hopkins et al. | |
| 2023/0201980 | A1 * | 6/2023 | Smith | B64F 5/50 29/897.2 |

* cited by examiner

SYSTEMS AND METHODS FOR FORMING COMPOSITE MEMBERS

RELATED APPLICATIONS

This application claims priority from U.S. Provisional App. No. 63/078,551, filed 15 Sep. 2020, the disclosure of which is incorporated by reference herein in its entirety.

TECHNOLOGICAL FIELD

The present disclosure relates generally to the field of composite members and, more specifically, to manufacturing systems configured to move different types of composite plies to a forming tool to form composite members.

BACKGROUND

The manufacturing of composite members includes laying up fiber-reinforced composite plies on a forming tool. Each of the individual composite plies has a fiber orientation angle in which the fibers are aligned within the ply. The different composite plies can be arranged at various orientations relative to the other plies. The stacking sequence of the individual composite plies in the composite member is a consideration in the design and manufacture of composite members. Different types of composite plies have different design variables, such as but not limited to material and fiber orientation and ply widths. The composite plies may be oriented and sequenced in an optimal arrangement to provide the optimal structural performance. The number of composite plies and types of materials can vary depending on the expected use of the composite member. The composite plies that are stacked together are then cured to form the composite member.

The multiple composite plies arranged at various orientations form a composite member that can provide superior structural performance over the individual material properties of each ply. This provides for the composite members to be used in a wide variety of applications such as but not limited to various parts on vehicles such as aircraft, trucks, boats, as well as structural components for buildings. The use of these members is effective due to their low weight, high strength-to-weight ratios, and design flexibility.

Current methods of laying up individual composite plies over a forming tool are performed manually or by machine. Manual layup is a time-consuming process requiring a large number of personnel performing a large amount of touch labor to layup multiple composite plies. The amount of touch labor may be significant for large-scale structures and high production rates. Machines such as automated tape-laying machines may reduce the amount of touch labor for laying up composite member. However, these machines are typically large and complex and may be prohibitively expensive. In addition, these machines may require a large amount of machine path programming which may impact production cost and scheduling.

Current machines and manufacturing layouts cause inefficiencies during the manufacturing process. The machines are often complex and limit the ability of a person to work in close proximity due to safety concerns (e.g., large mass, accelerations, and pinch points associated with the machines). Inefficiencies exist because persons are positioned outside of the larger operating envelope of the machine which is much larger than the more limited part envelope. Further, these machines cause poor work density with little value added touch per unit area at an instant in time. To account for these inefficiencies, current machines are designed with faster acceleration, deceleration, and speeds. This drives up overall costs and makes safety and work density improvement more challenging.

SUMMARY

One aspect is directed to a method of forming a composite member constructed from a plurality of composite plies. The method comprises: introducing first composite plies onto a conveyance member from a first supply station with the first composite plies comprising a first type; introducing second composite plies onto the conveyance member from one or more second supply stations that are positioned away from the first supply station along the conveyance member with the second composite plies from the second supply stations comprising different types than the first type; orienting the first and second composite plies on the conveyance member; individually transferring each of the first and second composite plies to a forming tool; and forming the first and second composite plies on the forming tool.

In another aspect, orienting first and second composite plies comprises transferring the first and second composite plies from the conveyance member and onto a support surface of a first support member and individually orienting each of the first and second composite plies relative to one or more datums at the support member.

In another aspect, the method further comprises cutting one or more of the first and second composite plies on a first level and then vertically transferring the first and second composite plies to the second level prior to forming the composite plies on the forming tool.

In another aspect, the method further comprises cutting the first composite plies at the first supply station and cutting the second composite plies at the one or more second supply stations prior to introducing the respective first and second composite plies onto the conveyance member.

In another aspect, the composite plies introduced from the first supply station have a variety of different widths.

In another aspect, the method further comprises moving the forming tool and positioning each of the first and second composite plies at predetermined positions on the forming tool.

In another aspect, the method further comprises introducing a custom composite ply between adjacent ones of the first and second composite plies with the custom composite ply being a different type than either of the first and second composite plies.

In another aspect, the method further comprises individually orienting each of the first and second composite plies on carrier medium and transferring each of the respective first and second composite plies to the forming tool while the respective first and second composite plies are supported by the carrier medium.

One aspects is directed to a method of forming a composite member constructed from a plurality of composite plies with the method comprising: introducing composite plies onto a conveyance member in a single-file predetermined order from a plurality of supply stations with the supply stations each supplying a different type of the composite plies; moving each of the composite plies along the conveyance member in the single-file predetermined order; individually orienting the composite plies relative to one or more datums; when each of the composite plies reaches a predetermined position, transferring the composite ply to a forming tool that is located away from the conveyance member; and forming the composite plies on the forming tool.

In another aspect, the method further comprises introducing a first one of the composite plies that is a first type of composite ply from a first one of the supply stations and introducing a second one of the composite plies that is a different second type of composite ply from a second one of the supply stations that is located along the conveyance member downstream from the first supply station.

In another aspect, the method further comprises cutting each of the composite plies at the respective supply station prior to introducing the composite plies onto the conveyance member with the composite plies from a first one of the supply stations comprising a leading edge that is aligned at a different angle than the composite plies from the second one of the supply stations.

In another aspect, the method further comprises orienting each of the composite plies on the conveyance member prior to transferring the composite plies to the forming tool.

In another aspect, the method further comprises moving each of the composite plies onto a support member located along the conveyance member downstream from the supply stations and individually orienting each of the composite plies on the support member prior to transferring the composite plies to the forming tool.

In another aspect, the method further comprises moving the support member to the forming tool while supporting the composite ply.

In another aspect, the method further comprises forming two or more of the composite plies into different widths at the respective supply station prior to introducing the composite ply onto the conveyance member.

One aspect is directed to a system for forming a composite member from a plurality of composite plies that have different types. The system comprises a conveyance member, a forming tool spaced away from the conveyance member, a plurality of supply stations positioned along the conveyance member, each of the supply stations configured to form a blank into one of the composite plies having a predetermined type that is different than the composite plies formed at the other supply stations and to introduce the composite plies onto the conveyance member; a transfer station located conveyance member downstream from the plurality of supply stations with the transfer station comprising a support member with a support surface that supports and transfers the composite plies from the conveyance member to the forming tool; and one or more forming machines located at the forming tool to form the composite plies onto the forming tool.

In another aspect, the plurality are supply stations form blanks with a variety of positive and negative front angles.

In another aspect, the plurality of supply stations are positioned on a first level that is vertically elevated above the one or more forming machines that are located on a second level.

In another aspect, the system includes carrier medium comprising a support surface to receive one of the composite plies, and with the carrier medium movable along the conveyance member prior to reaching the transfer station.

In another aspect, the transfer station comprises a robotic device with a vacuum with the robotic device to grasp each of the carrier medium and transfer the carrier medium to the forming tool.

The features, functions and advantages that have been discussed can be achieved independently in various aspects or may be combined in yet other aspects, further details of which can be seen with reference to the following description and the drawings.

DETAILED DESCRIPTION

Figure 1:
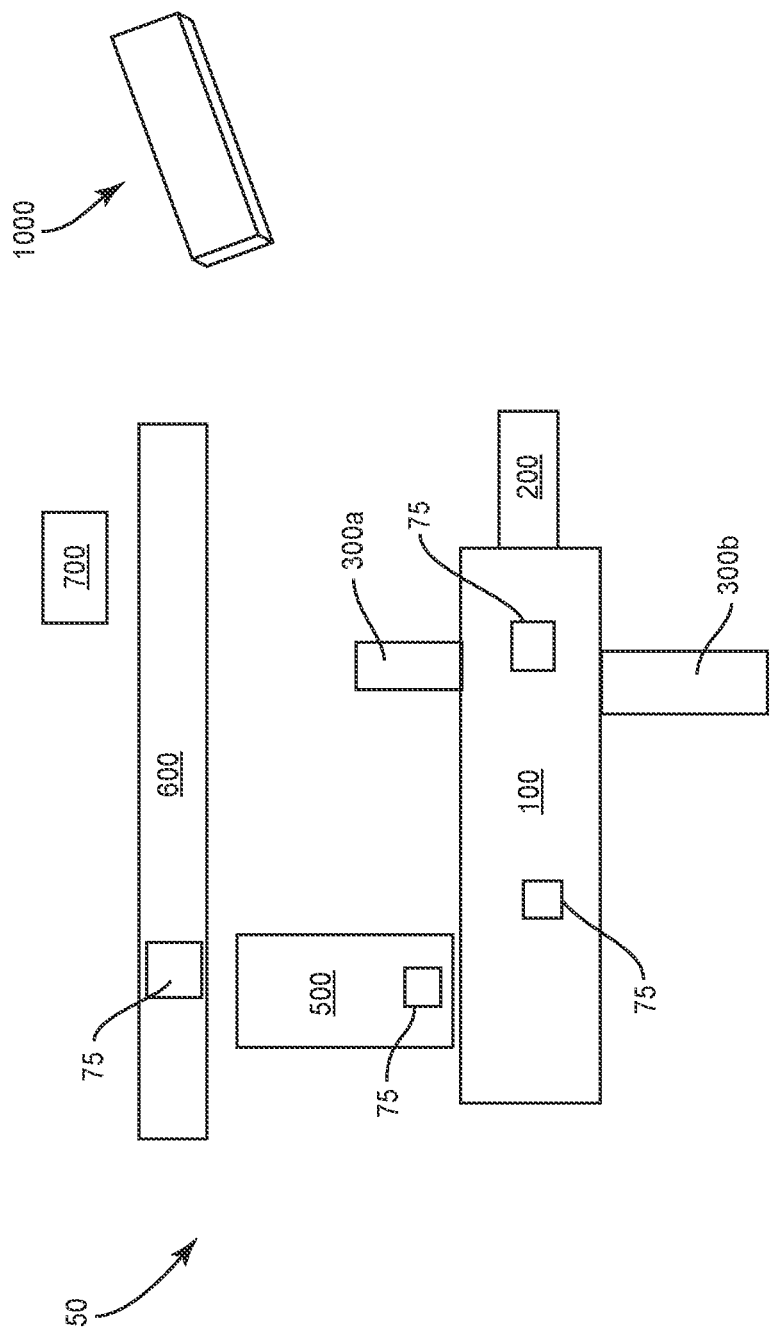
FIG. 1 is a schematic diagram of a system for manufacturing a composite member.

FIG. 1 illustrates a system 50 for manufacturing a composite member 1000. The system 50 is configured to move different types of composite plies 75 from multiple different supply stations 200, 300. The composite plies 75 are moved along a conveyance member 100 and then with a transfer station 500 to a forming tool 600. One or more forming machines 700 form the composite plies 75 onto the forming tool 600. The composite member 1000 is then removed from the forming tool 600 for additional processing as necessary to complete the structure.

Figure 2:
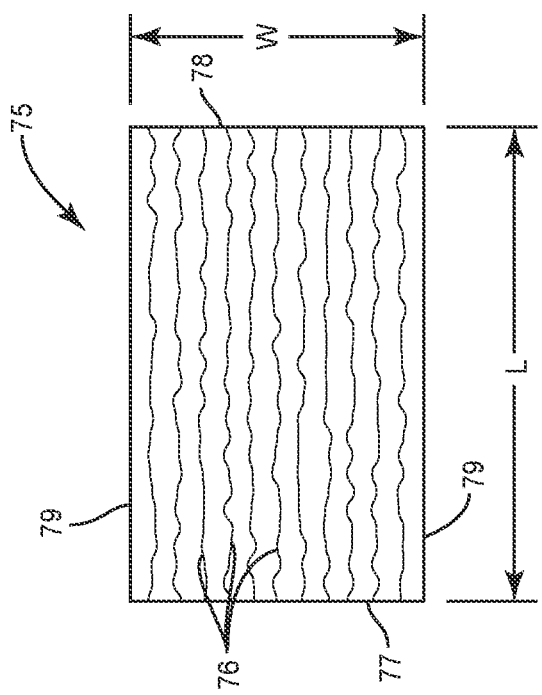
FIG. 2 is a schematic diagram of one type of composite ply.

The composite plies 75 are layed up on the forming tool 600 to form the composite member 1000. The total number, type, and orientation of the composite plies 75 that form the composite member 1000 can vary. FIG. 2 illustrates one example of a composite ply 75. The composite ply 75 is a sheet member that includes one or more layers of fibers 76 that are pre-impregnated with one or more of a thermoset and thermoplastic matrix resin (e.g., prepreg). In one example, a majority of the fibers 76 are oriented parallel to each other (e.g., parallel in a lengthwise direction). Other examples can include the fibers 76 aligned at different orientation, or randomly positioned (i.e., no alignment). The composite plies 75 can include one or more layers of fibers 76. In examples with multiple layers, the fibers 76 of the different layers can be aligned in the same or different orientations. In another example, the fibers 76 of one or more of the composite plies 75 are woven or braided and form a fabric.

The fibers 76 can be formed from a variety of materials, including but not limited to aramids, polyolefins, metal, glass, carbon, boron, ceramic, mineral, and combinations. The fibers 76 are pre-impregnated with a thermoset or thermoplastic matrix resin (e.g., prepreg). In another example, the matrix resin includes a hybrid system of both thermoset and thermoplastic. The matrix resin can be formed from a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions.

FIGS. 2-5 illustrate examples of different types of composite plies 75. As illustrated in FIG. 2, the various composite plies 75 include opposing ends 77, 78, and opposing sides 79. In one example, these ends 77, 78 are referred to relative to their movement along the conveyance member 100 with the end 77 being a leading end, end 78 being a trailing end, and sides 79 being lateral sides. The composite plies 75 include a length L measured between the ends 77, 78, and a width W measured between the sides 79. The different types of composite ply 75 can include a variety of different shapes and sizes.

Figure 5:
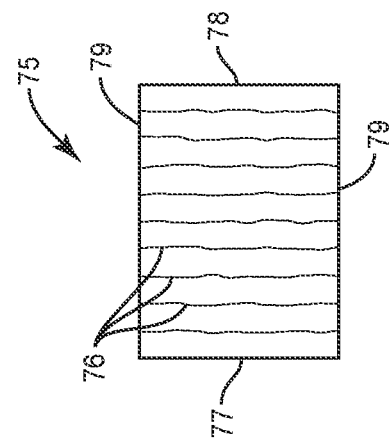
FIG. 5 is a schematic diagram of one type of composite ply.
Figure 4:
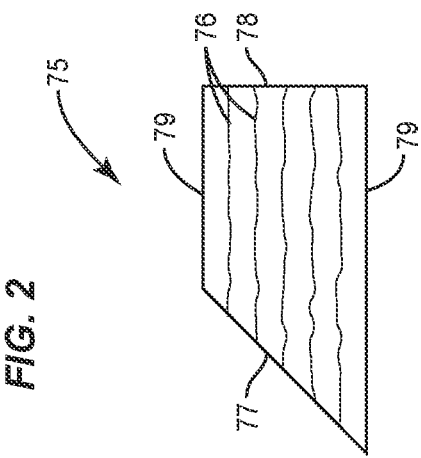
FIG. 4 is a schematic diagram of one type of composite ply.
Figure 3:
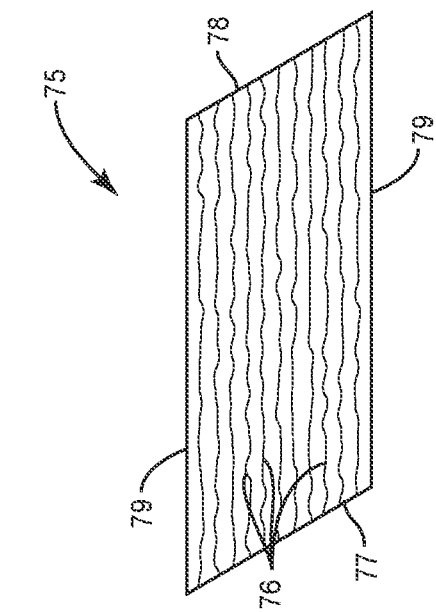
FIG. 3 is a schematic diagram of one type of composite ply.

The fibers 76 can be aligned at different orientations within the composite ply 75. In the example of FIGS. 2, 3, and 4, a majority of the fibers 76 are oriented parallel to the lengthwise direction measured between the ends 77, 78 (referred to as a 0° composite ply 75). Another example as illustrated in FIG. 5 includes a 90° composite ply 75 with the fibers 76 being substantially perpendicular to the lengthwise direction. Other examples include the fibers 76 aligned at various angular positions between these types. In composite plies 75 with multiple layers of fibers 76, the fibers 76 of each layer can be aligned in the same or different orientations. The different types of composite plies 75 can include a variety of thicknesses. Examples of thicknesses for each of the composite plies 75 includes but are not limited to between about 0.0025-0.0175 inches.

The various composite plies 75 are supplied from the various supply stations 200, 300. In one example, each of the different supply stations 200, 300 supplies a different type of composite ply 75. The different types can include but are not limited to different exterior shapes (e.g., rectangular, parallelogram), different widths, different fiber orientations (e.g., 0°, 90°), different thicknesses, and different constructions (e.g., different fibers and/or resins). Supplying different types of composite plies 75 from the different supply stations 200, 300 improves the efficiency. This prevents a supply station 200, 300 from changing different composite plies 75 which slows down the supply process.

Figure 6:
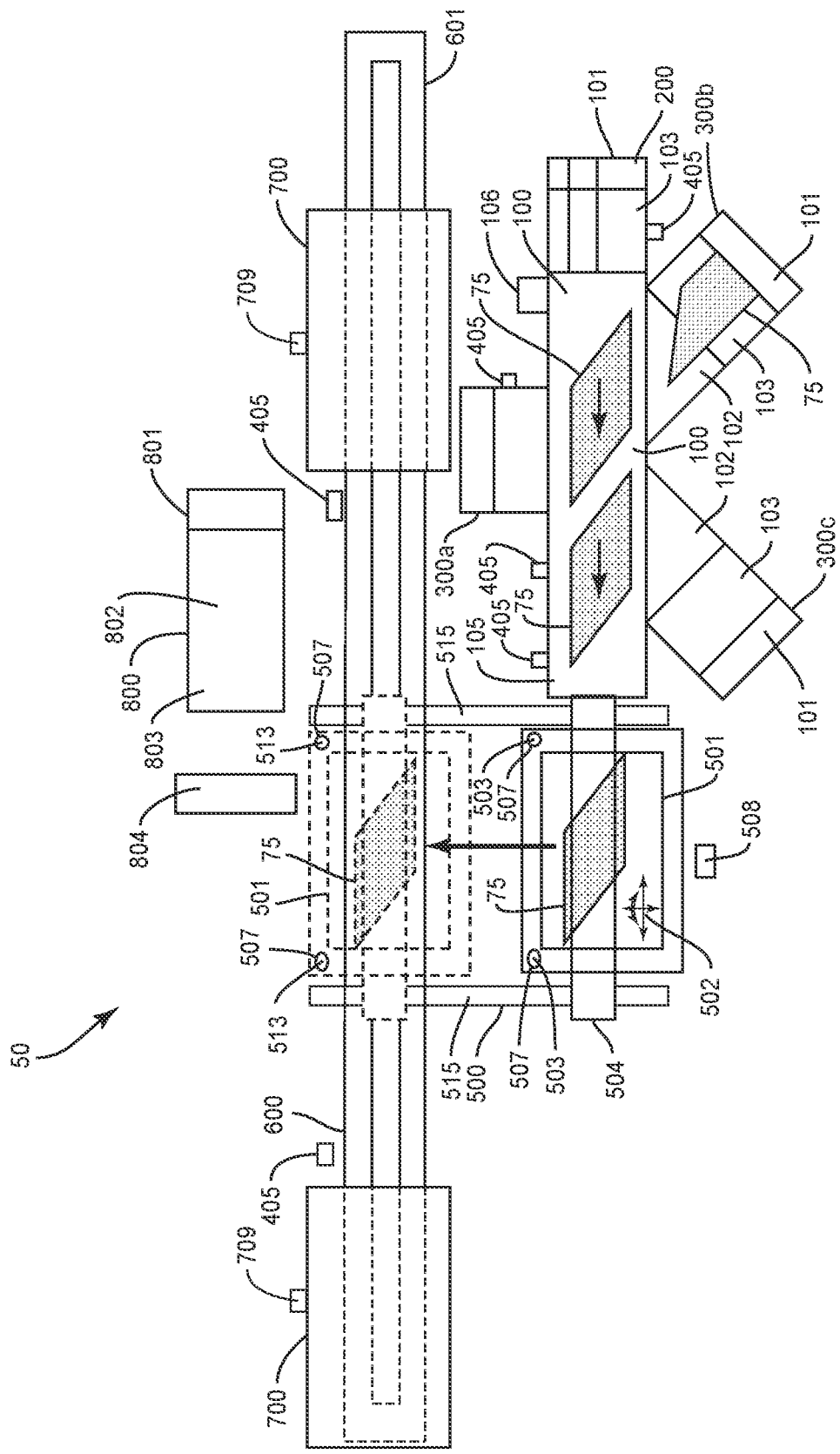
FIG. 6 is a schematic diagram of a system for manufacturing a composite member.

FIG. 6 illustrates a manufacturing system 50 for producing composite members 1000. The system 50 includes four supply stations 200, 300a, 300b, 300c that supply composite plies 75 to the conveyance member 100. One of the supply stations 200 is aligned at the end of the conveyance member 100. In one example, this main supply station 200 supplies the most frequently-used type of composite plies 75. For example, the main supply station 200 supplies 0° rectangular composite plies 75 of one or more widths (e.g., a 60 inch composite ply 75, a 30 inch composite ply 75, a 75 inch composite ply 75). In one specific example, the main supply station 200 supplies 0° rectangular composite plies 75 in three different widths.

Additional supply stations 300a, 300b, 300c are located along the conveyance member 100 downstream from the main supply station 200. These additional supply stations 300a, 300b, 300c supply different types of composite plies 75 than the main supply stations 200. In one example, each supply station 300a, 300b, 300c supplies a different type of composite ply 75. One or more of the additional supply stations 300a, 300b, 300c can supply composite plies 75 of different widths.

In one example, a cutter 101 is included at one or more of the supply stations 200, 300 to cut the composite plies 75 to the desired shape and size. The cutter 101 includes one or more blades that cut the composite ply 75. In one specific example, the cutter 101 is a guillotine-style cutter. The supply stations 200, 300 can further include a table 103 with support surface for positioning the composite plies 75 that are to be cut. In one example, a roll of composite material is positioned at the supply stations 200, 300. The roll is spread onto the table 103 and then cut by the cutter 101 to form the composite ply 75. Once cut, the composite ply 75 is then introduced onto the conveyance member 100. The supply stations 200, 300 can further include a smaller conveyance member 102 to move the cut composite ply 75 to the conveyance member 100. In another example, the composite plies 75 are already cut and are stored at the supply stations 200, 300. The cut composite plies 75 are then moved by the supply stations 200, 300 to the conveyance member 100.

The composite plies 75 can be cut to the desired shape and/or size at the supply stations 200, 300. This prevents and/or reduces the amount of wasted composite material that would otherwise result if the composite plies 75 where not tailored until reaching the forming tool 600.

In one example, the composite material includes a backing paper that is used to control the dispensing length. The table 103, conveyance member 102, or other structure is configured to remove the backing paper prior to the composite ply 75 reaching the conveyance member 100.

As illustrated in FIG. 6, the various supply stations 200, 300 can be aligned at various orientations relative to the conveyance member 100. FIG. 6 illustrates supply station 200 aligned with the conveyance member 100 (i.e., at a 0° angle), supply station 300a at a 90° angle, supply station 300b at a 45° angle, and supply station 300c at a −45° angle.

The conveyance member 100 functions to move the composite plies 75 from the respective supply stations 200, 300 to the transfer station 500. The conveyance member 100 can include a support surface on which the composite plies 75 are positioned, such as a conveyor. In another example, the composite plies 75 are initially transferred to a carrier medium, such as tray or sheet that is moved by the conveyance member 100. In one example, the composite plies 75 are oriented after leaving the supply stations 200, 300 and placed on the conveyance member 100. In another example, the composite plies 75 are simply moved by the conveyance member 100 and oriented at a downstream location.

In one example as illustrated in FIG. 6, the conveyance member 100 includes a belt 105. The belt 105 either directly supports the composite plies 75 or indirectly supports the composite plies 75 through the support member as they move along the length. The belt 105 can be solid to fully support the composite plies 75. In one example, belt 105 includes openings and a vacuum source 106 applies a vacuum to maintain the composite plies 75 contacted against the belt 105. The conveyance member 100 can include various lengths and shapes. In one specific example, the conveyance member 100 is a plank-style conveyor.

Sensors 405 are positioned along the supply stations 200, 300 and conveyance member 100. The sensors 405 provide for a system controller 400 (see FIG. 11) to oversee and control the movement of the composite plies 75. In one example, the sensors 405 include one or more cameras or other recording devices that detect the leading and/or trailing ends 77, 78 of the composite plies 75. In another example, sensors 405 include servomotor controllers attached to motors that propel the conveyance member 100. The system controller 400 can maintain a positive registry of the composite plies 75 as they move through the system 50. For each composite ply 75, the registry can include but is not limited to the orientation, type, initial position, current position, and travel path. In one example in which the composite plies 75 are transported on a carrier medium, the media has positive registry locations which enable the media to be rapidly and quickly transferred between stations and eventually on to forming tool 600.

The transfer station 500 is downstream from and receives the composite plies 75 from the conveyance member 100. As illustrated in FIG. 6, the transfer station 500 includes first datums 503 positioned in proximity to the conveyance member 100 and second datums 513 positioned in proximity to the forming tool 600. The datums 503, 513 provide reference points for alignment of a support member 501 that supports the composite plies 75. In one example, the first and second datums 503, 513 include one or more pins that extend upward and are positioned to be received in corresponding openings 507 in the support member 501. In another example, datums 503, 513 include one or more edges that contact against and locate the support member 501. In one example, the datums 503, 513 are the same (e.g., each comprising a pair of pins). In another example, the datums 503, 513 are different.

The transfer station 500 further includes the support member 501 and a movable support surface 502. In one example, the support member 501 is positioned immediately downstream from the conveyance member 100 such that the composite plies 75 move directly from the conveyance member 100 onto the support surface 502. In another example as illustrated in FIG. 6, a moving support member 504 extends between the conveyance member 100 and the support surface 502 to transfer the composite members 75 to the support surface 502. The moving support member 504 can include a powered belt or rollers, or can include a surface along which the composite plies 75 slide to reach the support surface 502.

Figure 7:
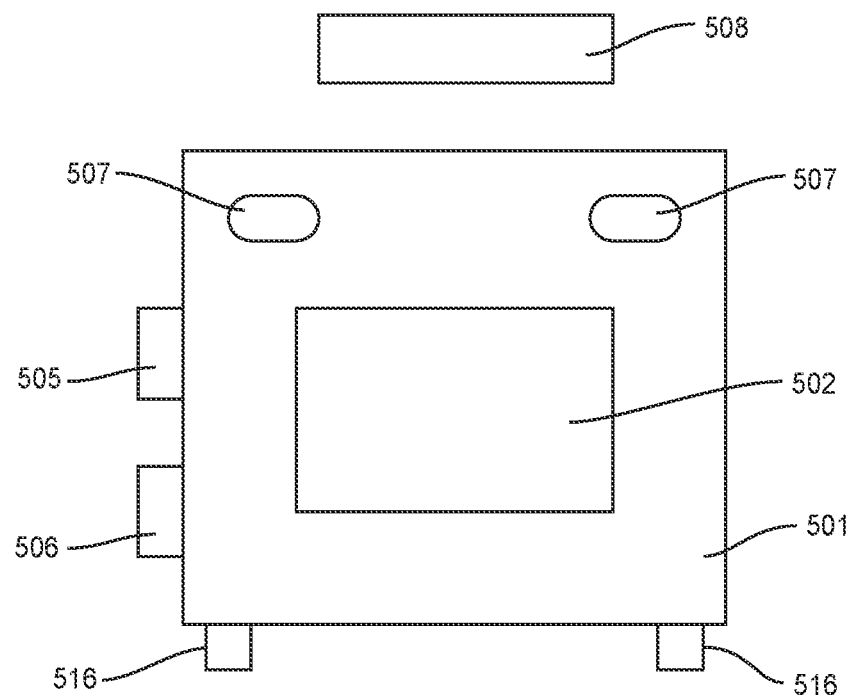
FIG. 7 is a schematic diagram of a portion of a transfer station.

As illustrated in FIGS. 6 and 7, the support member 501 extends around the support surface 502. In one example, the support member 501 extends around the entirety of the support surface 502. Other examples include the support member 501 extending around a portion of the support surface 502, or positioned below the support surface 502. One or more openings 507 extend through the support member 501 and provide for engaging with the datums 503, 513.

The support surface 502 is sized to receive and support one of the composite plies 75. In one example, the support surface 502 is relatively flat to contact and support the composite plies 75. One or more openings can extend through the support surface 502 and be connected to a vacuum source 505 to apply a vacuum to maintain the position of the composite ply 75. The support surface 502 is also configured to be adjustable relative to the support member 501. A motor 506 provides for adjusting the support surface 502. The adjustability provides for aligning the composite ply 75 at a predetermined position. A scanner 508 that includes one or more cameras scans the composite ply 75 while positioned on the support surface 502. One or more additional sensors 405 can be positioned at the transfer station 500 to detect the position of the support surface 502 and/or composite plies 75.

The transfer station 500 is further configured to transfer the support member 501 and support surface 502 that support the composite ply 75 from the conveyance member 100 to the forming tool 600. In one example as illustrated in FIGS. 6 and 7, rails 515 extend between the conveyance member 100 and the forming tool 600. The support member 501 includes receptacles 516 that engage with the rails 515 and are configured to move the support member 501 from the conveyance member 100 to the forming tool 600. In another example, a robotic arm is engaged with the support member 501 and moves the support member 501.

During use, a single composite ply 75 is moved from the conveyance member 100 to the support surface 502. The composite ply 75 can be transferred directly to the support surface 502, or when it is being transferred on a carrier medium, it may remain on the carrier medium. The composite ply 75 is aligned relative to the datum 503. Once aligned, the composite ply 75 is transferred to the forming tool 600.

The forming tool 600 is shaped and sized to represent the tooled surface of the desired composite member 1000, for example an airplane wing stringer or other primary or secondary structures, namely, Z-shaped beams, I-beams, hat stiffeners, C-channels, J-stiffeners, blade-stiffeners, floor-beams, ribs, frames, or spars. Although the forming tool 600 can include a variety of shapes and sizes, this disclosure is particularly applicable to a forming tool 600 with an elongated shape. For example, in an aircraft wing, a forming tool 600 for a stringer may have a length of up to 130 feet or longer.

Figure 8:
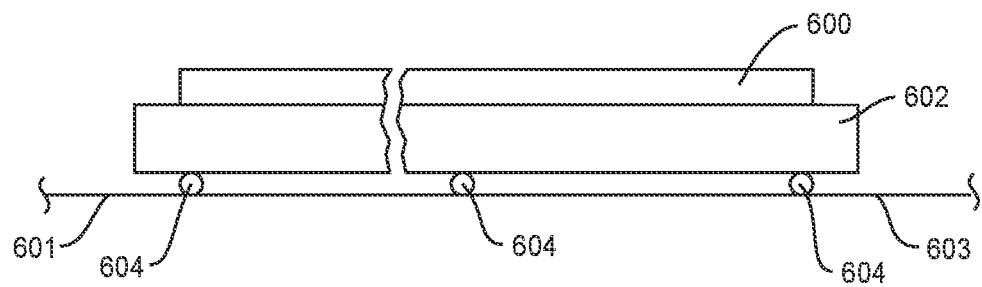
FIG. 8 is a schematic diagram of a forming tool.

As schematically illustrated in FIG. 8, the forming tool 600 is mounted on a tool table 602 configured to move along a forming lane 601. The tool table 602 is adapted to be movable along a pair of rails 603 to facilitate movement of the forming tool 600 and the sequential application of a series of composite plies 75 at different spanwise locations along the forming tool 600. The rails 603 may be mounted on a shop floor or on another surface. In one example, rollers 604 extend outward from the bottom and/or side of the tool table 602 and contact against and ride along the rails 603.

In one example, the rails 603 have a discrete length. The tool table 602 moves back-and-forth along the rails 603 in a reciprocating manner. In another example, the rails 603 are formed in a continuous loop. The tool table 602 moves in a single direction repeatedly around the loop.

The forming tool 600 is moved along the forming lane 601 to receive the composite plies 75 from the transfer station 500. In one example, the forming tool 600 is initially positioned with a first end at the transfer station 500 to receive a composite ply 75. The forming tool 600 is then sequentially moved to through the transfer station 500 to receive additional composite plies 75 in an end-to-end configuration. This process can continue with multiple courses of composite plies 75 placed at the spanwise locations as the forming tool 600 moves along the forming lane 601 in end-to-end relation with the first course of material. Additional composite plies 75 may be applied over previously-laid plies in the above-described manner until the desired ply stacking sequence is achieved.

Figure 9:
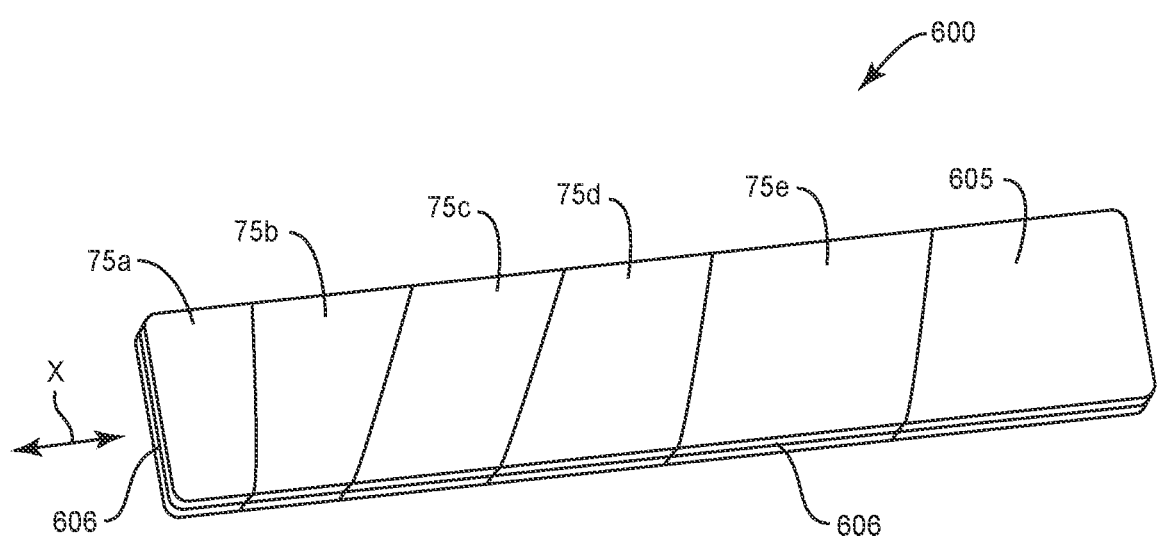
FIG. 9 is a schematic diagram of composite plies layed up on a forming tool.

FIG. 9 schematically illustrates one example of a forming tool 600 that is shaped to correspond to the desired composite part. The forming tool 600 includes a top 605 and sides 606. In one example, the forming tool 600 is configured to translate back-and-forth as illustrated by arrow X. In another example, the forming tool 600 moves around a loop. In the various examples, the first composite ply 75a is positioned at an end of the forming tool 600. The first composite ply 75a extends over a section of the top 605 and along the sides 606, including the end side and opposing lateral sides. The forming tool 600 is sequentially moved for additional composite plies 75b-75e that are placed sequentially along the forming tool 600 in an end-to-end configuration. In one example, the adjacent composite plies 75 overlap a limited amount. In another example, the adjacent composite plies 75 abut together without overlap. FIG. 9 illustrates composite plies 75 partially layed upon along the forming tool 600. The process would continue with additional composite plies 75 positioned along the remaining length of the forming tool 600. Once completed, one or more additional layers of composite plies 75 can be layed up along the entirety or one or more sections. Sensors 405 can be positioned to detect the number and positioning of the composite plies 75 on the forming tool 600.

Figure 10:
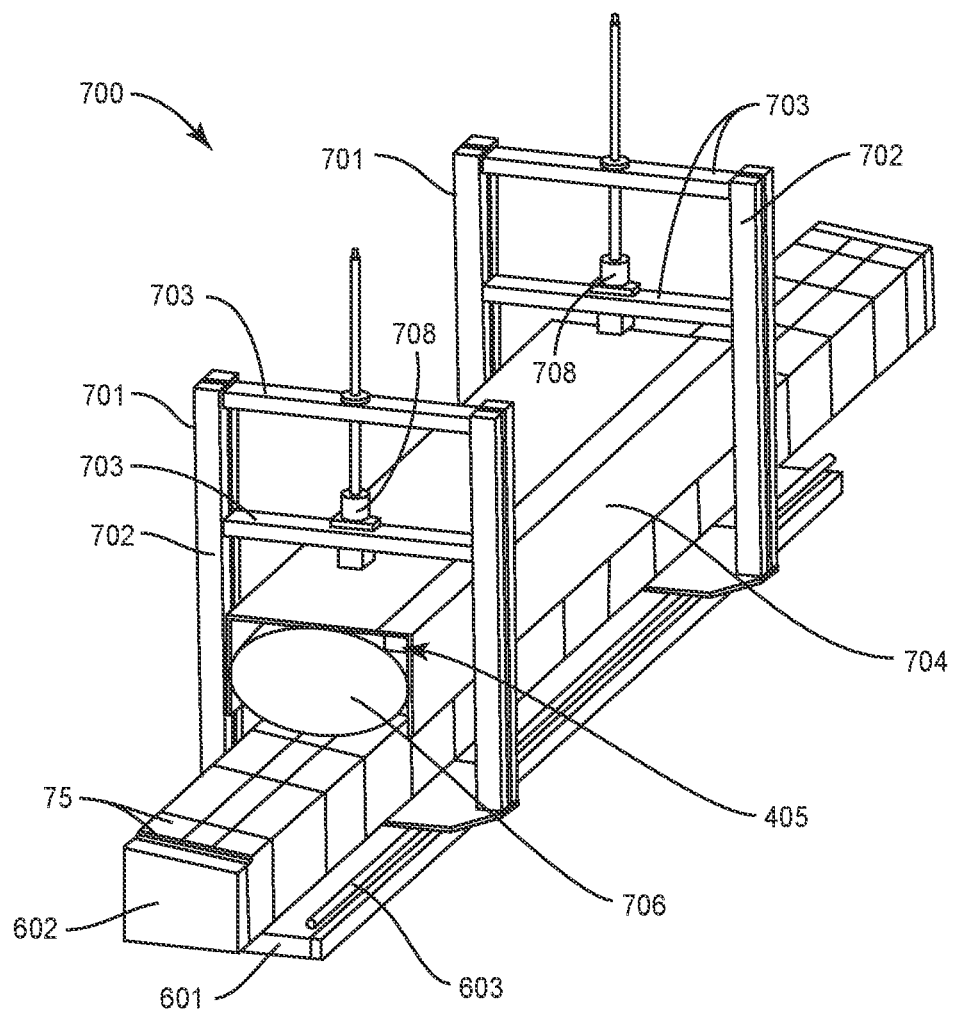
FIG. 10 is a schematic diagram of a forming machine.

One or more forming machines 700 form the composite plies 75 to the forming tool 600. The forming machines 700 include one or more arms with contact surfaces that contact against and apply a mechanical force to the composite plies 75. FIG. 10 illustrates an example of a forming machine 700. The forming machine 700 straddles the forming lane 601 along which the forming tool 600 travels. In one example, the one or more forming machines 700 are fixed in position with the forming tool 600 traveling along the forming lane 601 relative to the forming machines 700.

The forming machine 700 can include one or more supports 701 that include legs 702 and one or more cross-braces 703. The legs 702 are spaced apart to be positioned on opposing sides of the forming lane 601. A shroud 704 extends under the supports 701 and includes an interior space 705 to receive the forming tool 600. The shroud 704 is configured to surround and/or extend at least partially around the forming tool 600. In one example as illustrated in FIG. 10, the shroud 704 includes a substantially U-shaped transverse cross-sectional shape. The shroud 704 may be formed from any suitable material to be a rigid, or at least substantially rigid. An engagement member 708 can maintain and position the shroud 704. The engagement member 708 can include one or more of a screw jack, a linear actuator, a motor, an electric motor, and a pneumatic motor.

A force-applying device 706 is positioned within the shroud 704 and is configured to apply a force to conform the composite plies 75 to the tool table 602. In one example, the force-applying device 706 is an inflatable bladder. In another example, the force-applying device 706 comprises mechanical arms with contact members at the distal ends that contact against and apply a force to the composite plies 75. A sensor 405 is positioned to detect and regulate the amount of force applied by the force-applying device 706.

In one example, the force-applying device 706 directly contacts against the top-most composite plies 75. In another example, an intermediate film is placed on the upper-most composite plies 75. Under these conditions, the force-applying device 706 directly contacts the intermediate film and may indirectly contact the composite plies 75. Examples of intermediate films include but are not limited to a contact film, a release film, and a fluoropolymer film.

In one example, the forming machine 700 forms a single layer of composite plies 75 onto the forming tool 600. In another example, a plurality of composite plies 75 are layed-up on to the forming tool 600 to form multiple layers. The forming machine 700 is configured to apply pressure to conform each of the composite plies 75 in the multiple layers against the forming tool 600. This may include concurrently pressing at least two, or even the plurality of, stacked composite plies 75 against the forming tool 600.

The forming machine 700 may maintain the pressure against the composite plies 75. Examples of the threshold pressure differential include threshold pressure differentials of less than 5 kilopascals (kPa), less than 10 kPa, less than 15 kPa, less than 20 kPa, less than 25 kPa, less than 30 kPa, less than 50 kPa, or less than 75 kPa.

The forming machine 700 may further include one or more heaters 709 to heat the composite plies 75 while the pressure is applied. The heating of the composite plies 75 can occur prior to the forming of the composite plies 75 onto the forming tool 600. Heating of the composite plies 75 allows them to be more easily conformable to the forming tool 600 as opposed to a composite plies 75 at ambient or room temperature. Heating can be accomplished using infrared lamps, conventional light bulbs, or any other known heating techniques. Depending on the composition of the composite plies 75, the temperature can be raised to about less than or equal to 200° F. The temperature of the composite plies 75 can be measure in any conventional manner, such as, with attached thermocouples.

Some or all functionality of the system 50 can be controlled by a system controller 400. The system controller 400 communicates with the various components and controls and oversees the operation of the composite members 1000. The system controller 400 may be housed in a cabinet or the like at some distance from the components. In another example, the system controller 400 is housed within one of the components.

Figure 11:
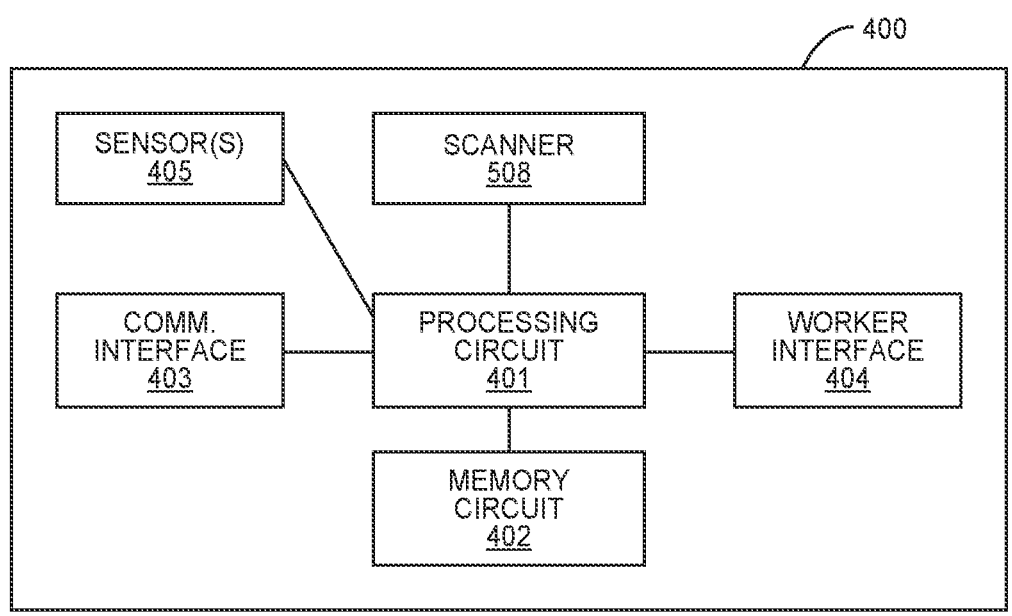
FIG. 11 is a schematic diagram of a system controller.

As illustrated in FIG. 11, the system controller 400 include a processing circuit 401 control circuit with one or more microprocessors, microcontrollers, and ASICs that with appropriate software and/or firmware. A memory circuit 402 stores data and computer readable program code that configures the control circuit to implement the techniques described above. Memory circuit 402 is a non-transitory computer readable medium, and may include various memory devices such as random access memory, read-only memory, and flash memory.

The system controller 400 may also include a communication interface 403 to send and receive data to the components. The communication interface can provide for communications through a cabling system with various cables extending between the elements. The cables are configured for carrying various data signals. In one design, the system communicates through a LAN, with another design featuring communication through a communications bus. The communications interface 403 can also provide for wireless communications, such as through a Bluetooth interface or wireless local area network (WLAN) interface. Some examples feature a combination of cabling and wireless communications.

A user interface 404 includes one or more user input devices such as a keypad, touchpad, function keys, scroll wheel, or other type of computer input device. The user interface 404 can include a display screen, such as a conventional liquid crystal display (LCD) or touch screen display which also functions as a user input device. The user interface 404 provides for the worker to control the functions of the various components that are in communication with the system controller 400.

One or more sensors 405 may detect the position of the composite plies 75 as they move through the system 50. Sensors 405 can also detect the operational conditions of one or more of the components. Various sensor types may be used, including a camera, heat sensor, and movement sensor. Scanner 508 can be located at the transfer station 500 to capture the orientation of the composite plies 75. FIG. 11 schematically illustrates the sensors 405 and scanner 508 included in the system controller 400. One or more of the sensors 405 and/or scanner 508 can be part of the associated component and communicate with the system controller 400 through the communication interface 403.

Figure 12:
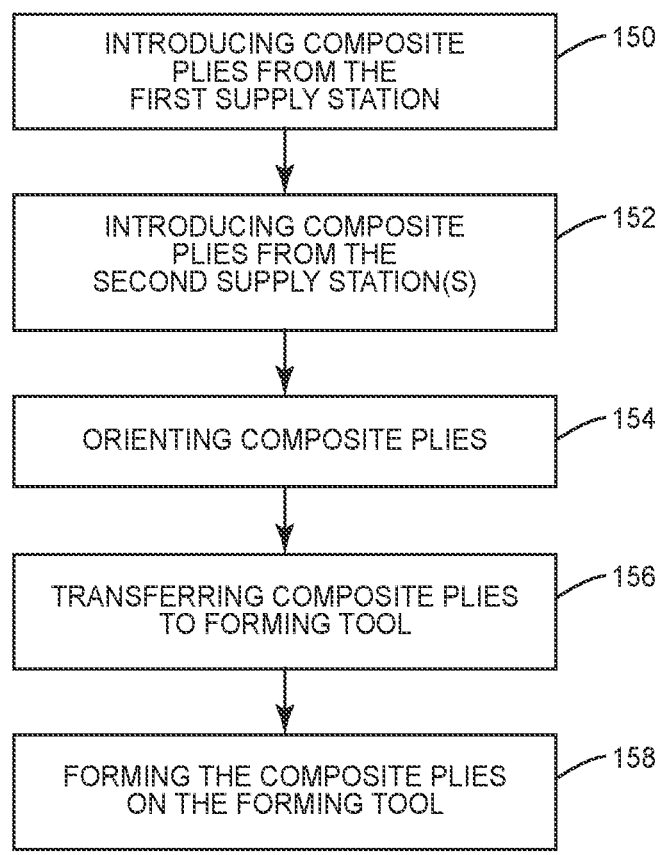
FIG. 12 is a flowchart diagram of a method of manufacturing a composite member.

FIG. 12 illustrates a method of forming a composite member 1000 from the composite plies 75. The method includes introducing a first type of composite plies 75 onto the conveyance member 100 from the supply station 200 (block 150). Second composite plies 75 of a different second type are introduced from one or more of the other supply stations 300 (block 152). The first and second composite plies 75 are oriented conveyance member 100 (block 154). The orientation can occur when the composite plies 75 are placed onto the conveyance member 100 at the supply stations 200, 300, or can occur at the transfer station 500 on the support surface 502. In one example, the composite plies 75 are placed and oriented onto a carrier medium and moved through the system 50 while remaining on the carrier medium. In another example, the composite plies 75 are positioned directly onto the conveyance member 100. The composite plies 75 are individually transferred to the forming tool 600 (block 156). The composite plies 75 are then formed on the forming tool 600 (block 158).

A more detailed method can be used in combination with the system 50 illustrated in FIG. 6 and controlled by the system controller 400. The system controller 400 provides for a predetermined order of composite plies 75 to be fed onto the conveyance member 100 from the supply stations 200, 300a, 300b, 300c. For example, a first type of composite ply 75 is fed from the supply station 200, followed by a second type of composite ply 75 from the supply station 300a, and then a third type of composite ply 75 from supply station 300c.

In one example, the composite plies 75 are placed and oriented on a carrier medium. The composite plies 75 remained oriented on the carrier medium while moving through the system 50 and transferred at some downstream point.

From the supply stations 200, 300a, 300b, 300c, the composite plies 75 are then moved by the conveyance member away from the supply stations 200, 300a, 300b, 300c to the transfer station 500. The system controller 400 can monitor the orientation and positioning of the composite plies 75 through the sensors 405 located along at the supply stations 200, 300a, 300b, 300c and the conveyance member 100.

At the transfer station 500, each composite ply 75 is individually moved onto the support surface 502. The composite ply 75 is scanned by the scanner 508 and the support surface 502. When necessary, the composite ply 75 is re-oriented to align the composite ply 75 relative to the one or more datums 503. Once aligned, the transfer station 500 moves the composite ply 75 to the forming tool 600. The support surface 502 is aligned with the one or more datums 513 to maintain the desired orientation of the composite ply 75. The composite ply 75 is then placed onto the forming tool 600. Prior to the placement, the forming tool 600 is positioned along the forming lane 601 to receive the composite ply 75.

Multiple composite plies 75 are oriented, transferred, and placed on the forming tool. Once a predetermined number of composite plies 75 are positioned on the forming tool 600, the forming tool 600 is moved along the forming lane 601 and the composite plies 75 are positioned at the forming machine 700. The forming machine 700 forms the composite plies 75 onto the forming tool to conform to the desired shape.

The system 50 can further include a custom supply station 800 as illustrated in FIG. 6 to provide for custom types of composite plies 75 that are not supplied from one of the other supply stations 200, 300. For example, the custom composite plies 75 can include different shapes, sizes, or constructions. The custom supply station 800 can include one or more of a cutter 801, conveyance member 802, and table 803. In one example, the composite plies 75 from the custom supply station 800 are manually transferred to the transfer station 500 or directly onto the forming tool 600. In another example, the custom supply station 800 includes a placement mechanism 804 such as a conveyor or gripper (e.g., vacuum-assisted, mechanical finger gripper) for moving the composite plies 75 to the transfer station 500 or directly to the forming tool 600.

Figure 13:
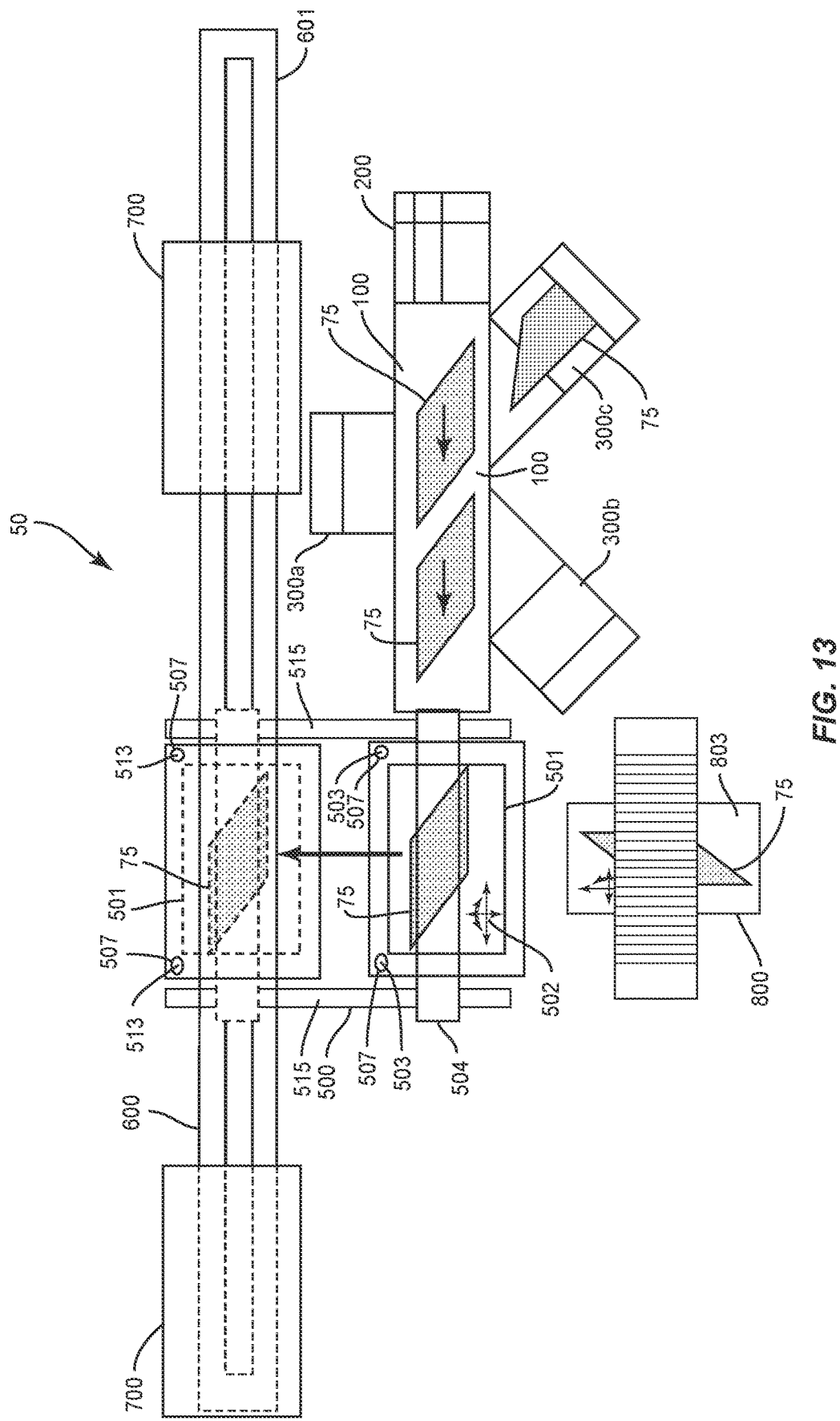
FIG. 13 is a schematic diagram of a system for manufacturing a composite member.

The system 50 can also be configured to include additional components and/or different configurations. FIG. 13 includes a system 50 with the custom supply station 800 positioned to transfer the composite plies 75 to the transfer station 500. The custom supply station 800 includes a support table 803 that translates or rotates to orient the composite plies 75 prior to transfer to the transfer station 500.

Figure 14:
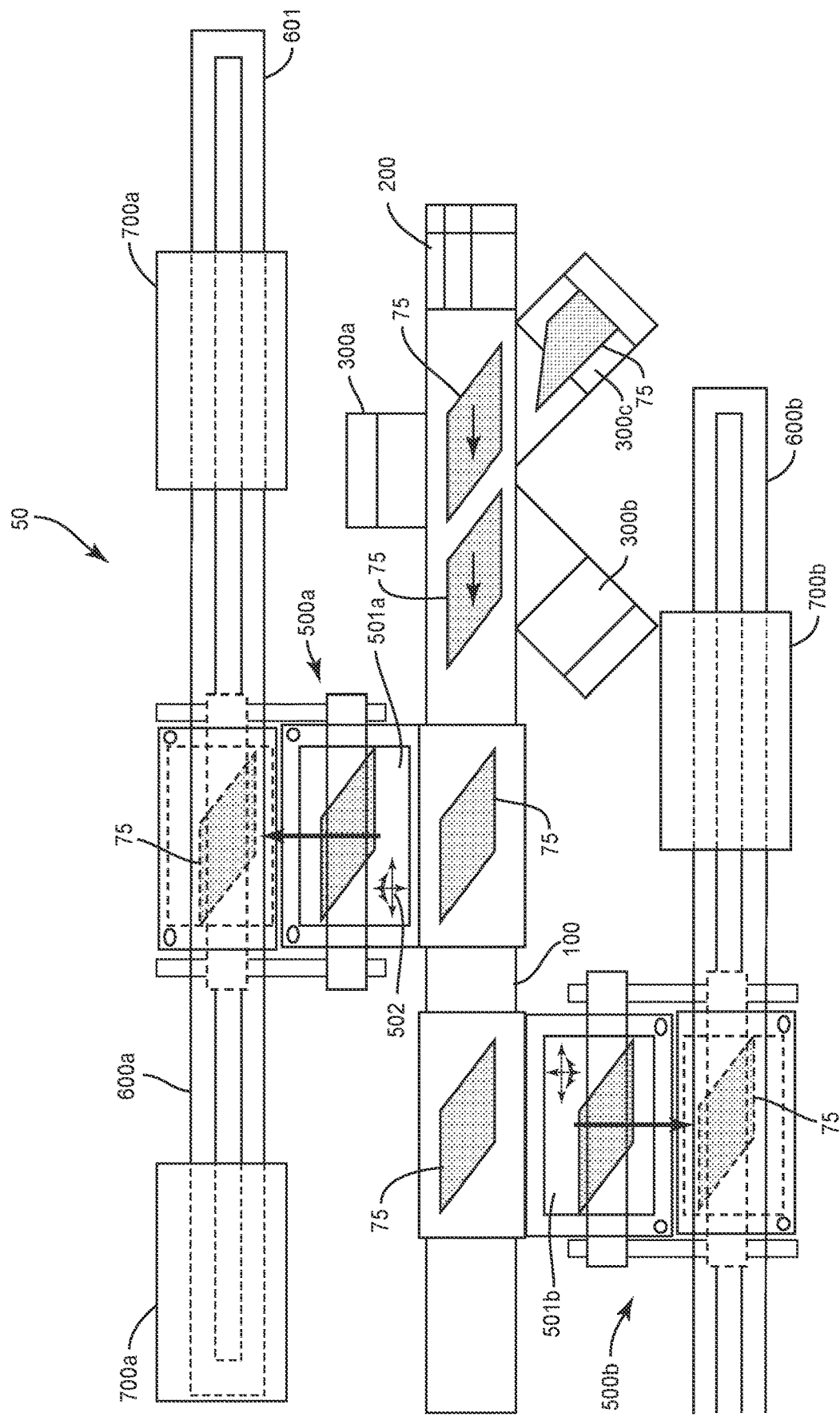
FIG. 14 is a schematic diagram of a system for manufacturing a composite member.

FIG. 14 includes a system 50 in which supply stations 200, 300a, 300b, 300c supply a pair of forming tools 600a, 600b. The supply stations 200, 300a, 300b, 300c move composite plies 75 to a conveyance member 100. A first transfer station 500a receives composite plies 75 and transfers them to the first forming tool 600a. A portion of the composite plies 75 remain on the conveyance member 100 and travel past the first transfer station 500a to a second transfer station 500b. These composite plies 75 are moved to a second transfer station 500b to a second forming tool 600b. An advantage of this system 50 is that a worker or group of workers can be positioned at the supply stations 200, 300a, 300b, 300c and supply composite plies 75 to two different forming tools 600a, 600b.

Figure 15:
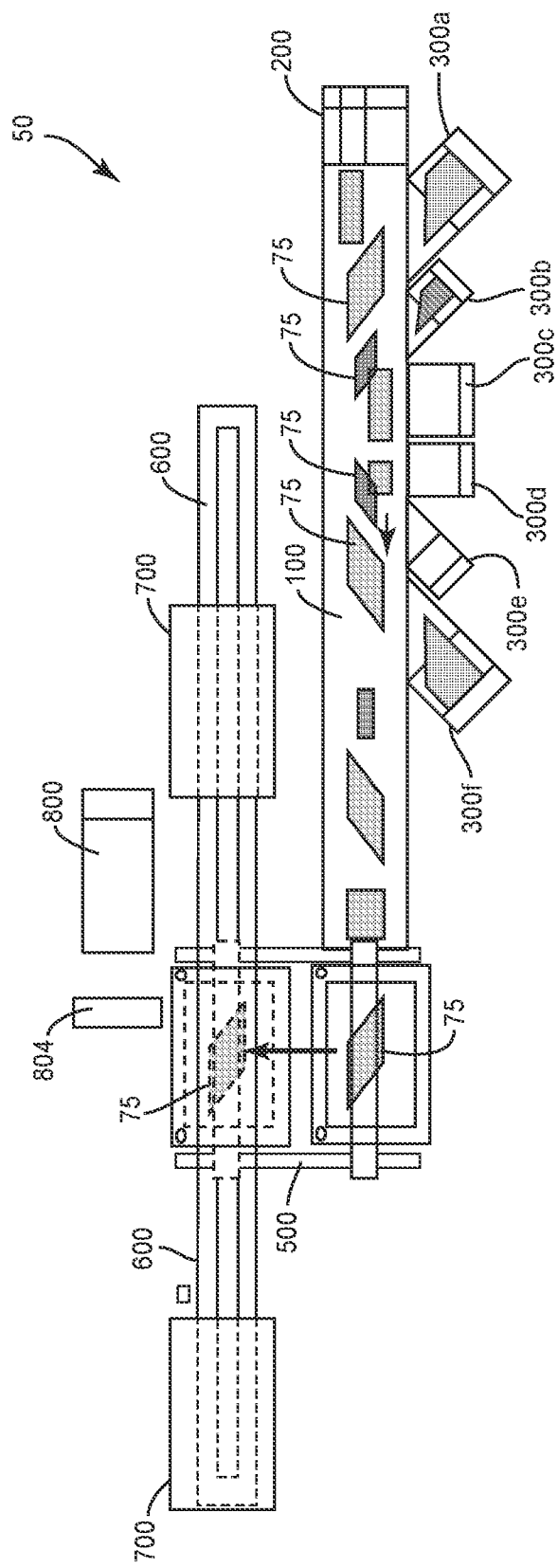
FIG. 15 is a schematic diagram of a system for manufacturing a composite member.
Figure 16:
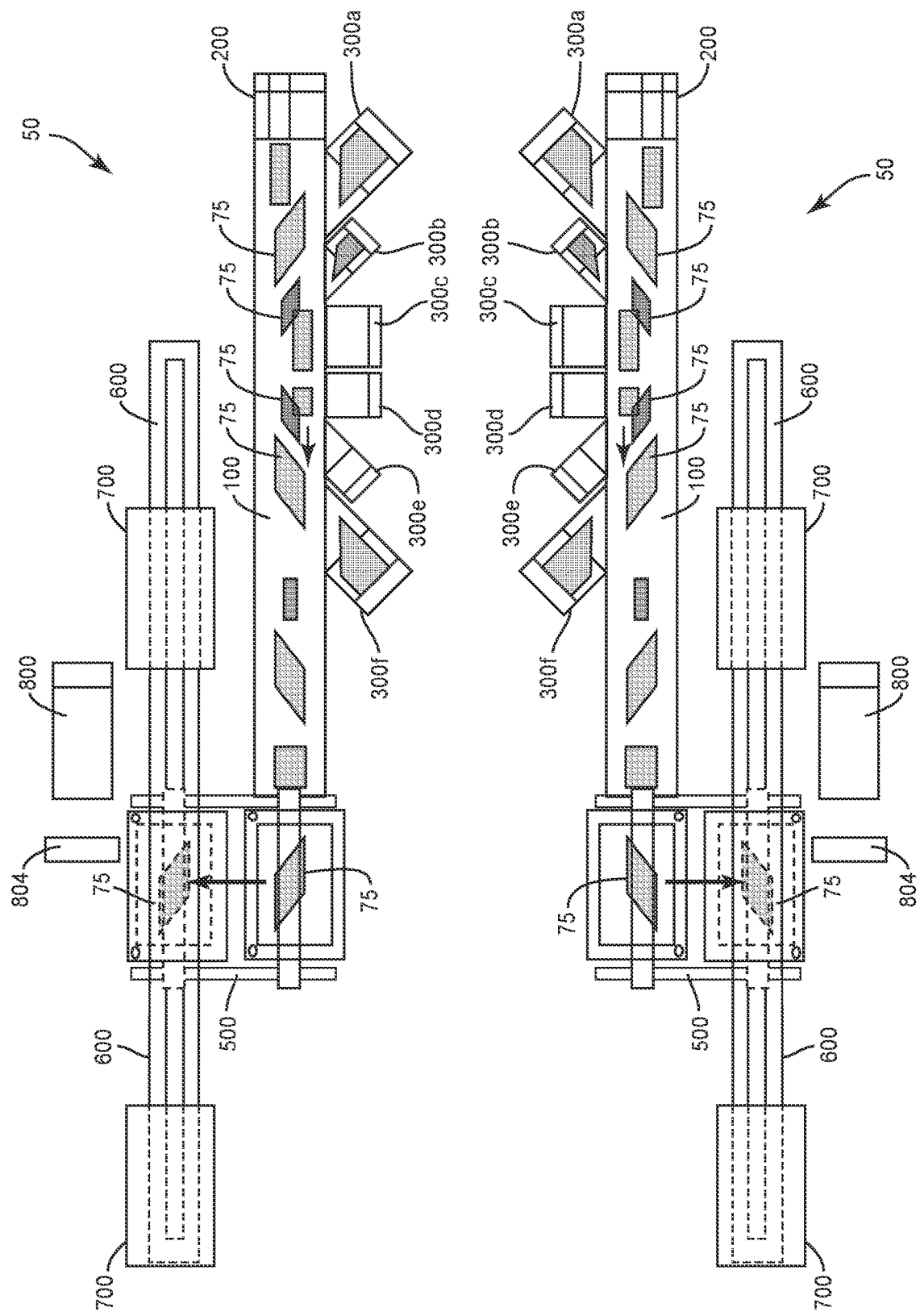
FIG. 16 is a schematic diagram of a system for manufacturing a composite member.

FIG. 15 includes a system 50 with numerous supply stations 200, 300 supplying different types of composite plies 75 to the conveyance member 100. In one example, supply station 200 provides different widths of composite plies 75 of a first construction. Supply stations 300 provide different types of composite plies 75. In one example the different supply stations 300 provide different sizes and shapes of both 30 inch and 60 inch broad goods. The system 50 of FIG. 15 provides for a single work station for a user to reload the different types of composite material to the supply stations 200, 300. The system 50 of FIG. 15 can be duplicated as illustrated in FIG. 16 such that the single work station provides for feeding two separate conveyance members 100.

Figure 17:
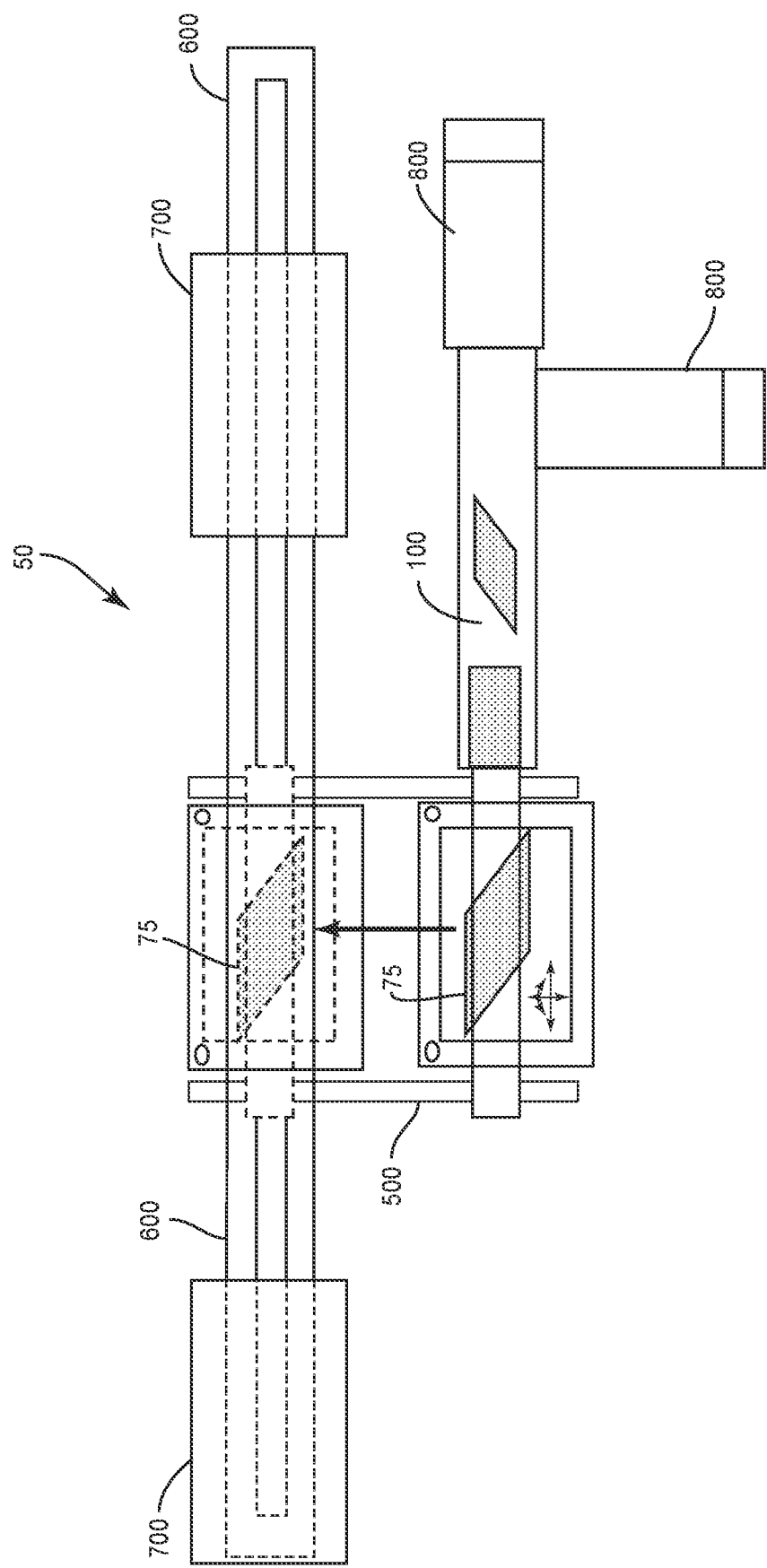
FIG. 17 is a schematic diagram of a system for manufacturing a composite member.

FIG. 17 includes a system 50 with custom supply stations 800 providing custom types of composite plies 75 to the conveyance member 100.

Figure 18:
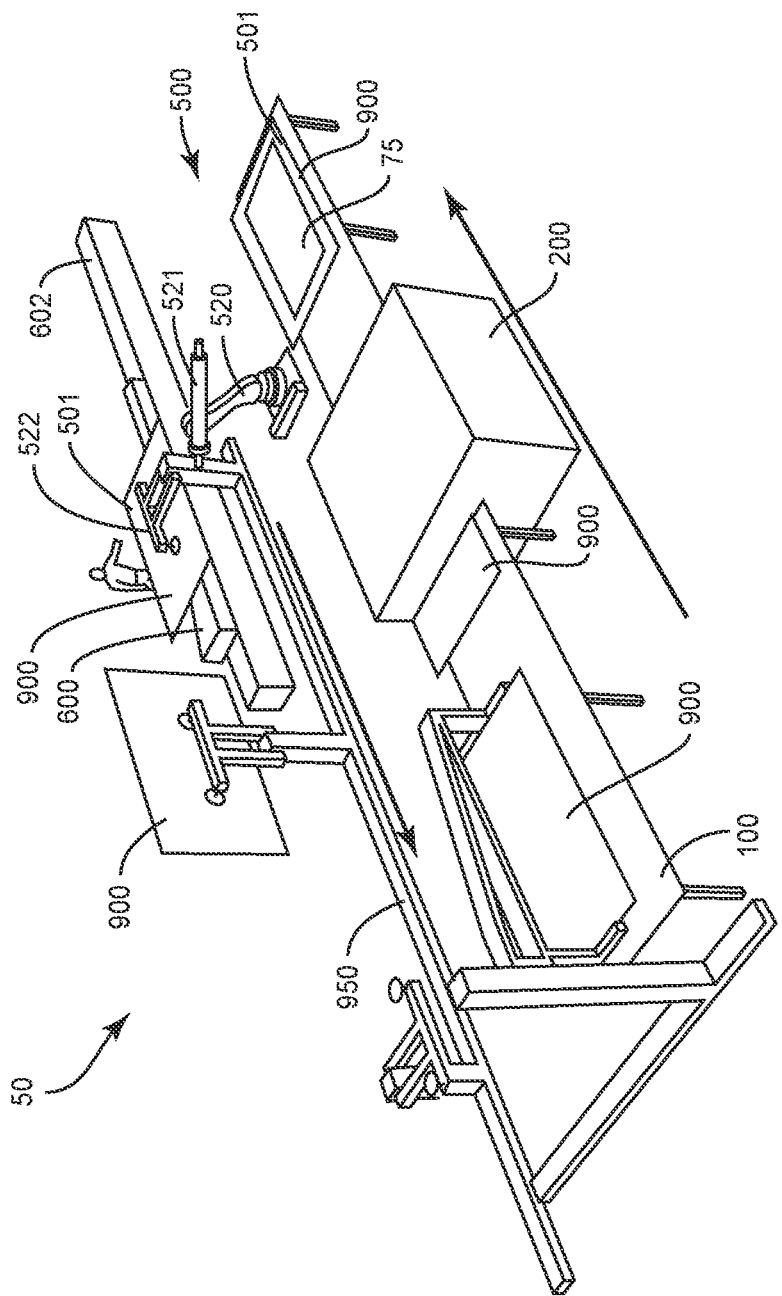
FIG. 18 is a schematic diagram of a system for manufacturing a composite member.

In one example as illustrated in FIG. 6, the composite plies 75 are placed directly onto the conveyance member 100 and moved from the supply stations 200, 300 to the transfer station 500 In another example as illustrated in FIG. 18, the composite plies 75 are placed and moved on carrier medium 900. A composite ply 75 is moved from a supply station 200 and aligned on the carrier medium 900. FIG. 18 includes a single supply station 200. Other examples can include multiple different supply stations 200, 300 that can supply different types of composite plies 75. The carrier medium 900 and composite ply 75 are moved along the conveyance member 100 to the transfer station 500. The transfer station 500 includes a robotic device 520 with a movable arm 521 and a gripper 522 at a distal end. The gripper 522 can include one or more vacuum openings. The robotic device 520 is movable from a first position to attach the gripper 522 to a surface of the carrier medium 900 to a second position at the forming tool 600. At the second position, the robotic device 520 aligns the carrier medium 900 with the forming tool 600. The composite ply 75 is then released from the carrier medium 900 onto the forming tool 600. In one example, the vacuum from the robotic device 520 is used to maintain the composite ply 75 positioned on the carrier medium 900. Once the carrier medium 900 is positioned onto the forming tool 600 with a slight level of compaction, the vacuum is released and the composite ply 75 is placed on the forming tool 600.

In one example as illustrated in FIG. 18, after the composite ply 75 is transferred, the carrier medium 900 is attached to a handling system 950. The handling system 950 moves the carrier medium 900 and then transfers it back to a beginning of the conveyance member 100 to repeat the process.

In one example, the system 50 includes the various components (e.g., conveyance member 100, supply stations 200, 300, forming tool 600) positioned on the same level. In this system, the composite plies 75 move along the level during the manufacturing process. In another example, one or more of the components are positioned on different levels. This can reduce the size of the work area and can also reduce the amount of travel of the composite plies 75 when moving between the various components.

Figure 19:
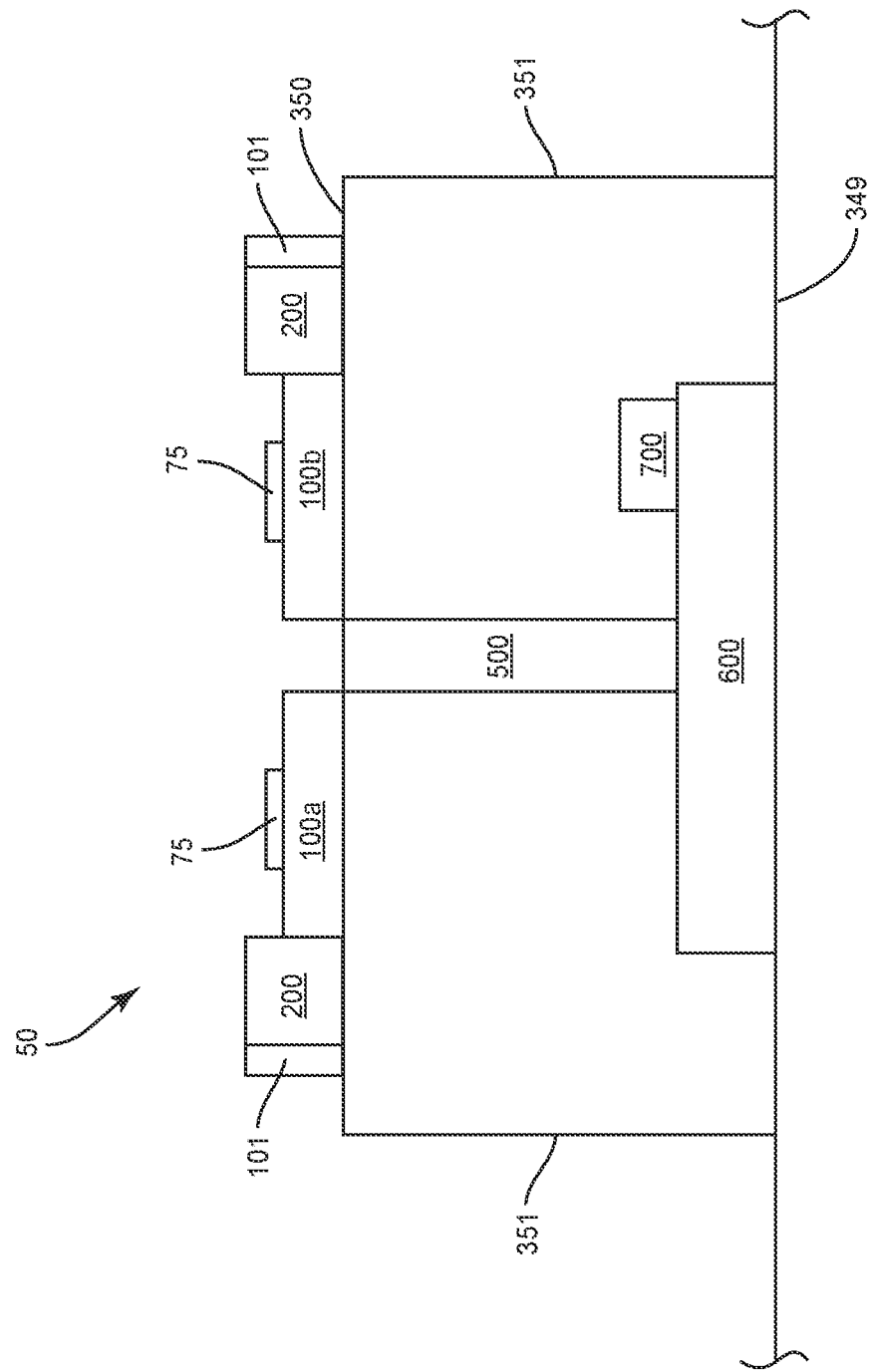
FIG. 19 is a schematic diagram of a system for manufacturing a composite member.

FIG. 19 schematically illustrates a system 50 with components on multiple different levels 349, 350. In this example, supply stations 200, 300 that each include one or more cutters 101 are positioned on the second level 350 which is elevated by supports 351 above the first level 349. The composite plies 75 with the needed shapes and sizes are cut and moved to a transfer station 500. In one example, each of the composite plies 75 is cut while at the first level 349. In another example, one or more of the composite plies 75 is already at the desired shape and/or size and is not cut while on the first level 349. The transfer station 500 vertical moves the composite plies 75 from the second level 350 to the first level 349. The composite plies 75 are positioned on the forming tool 600 and are then formed by the forming machine 700.

In another example, the supply stations 200, 300 include cutters 101 for cutting the composite plies 75 to the desired shapes and sizes. The composite plies 75 are then moved to the transfer stations 500 from the supply stations 200, 300.

The various systems 50 overcome the issues of prior art designs. The systems 50 provide for user work stations in the area where they are performing work and along just a limited area of the whole system 50. The work stations are away from other equipment that is part of the system 50 and allows the worker to work in closer proximity to the equipment that they need to operate as part of the process. For example, the user can be positioned at one or more of the supply stations 200, 300 to cut and/or position the composite plies 75 onto the conveyance member 100, while being positioned away from the transfer station 500, forming tool 600, and forming machine 700.

The systems 50 include components that are relatively smaller than more complex machines. The components of the systems 50 have smaller masses, more limited functionality and smaller machine envelope. This enables safer and greater process packing density that includes the number of workers and machines within a given area. This also allows for an increased number of parallel operations occurring at any instant in time thereby increasing process packing density (process equipment or people per square foot of area) and product work density (number of value added operations on product at any instant). It is the combination of smaller work stations, simpler and smaller equipment and process, and the number of parallel processing operations coupled with greater process packing density and product work density which leads to step function changes in productivity.

In one example, many of the operations are automated thus reducing the number of workers necessary to run the systems 50. In one specific example, workers operate the one or more supply stations 200, 300 to feed composite plies 75. The remaining operations are automated and run without active worker involvement.

Figure 20:
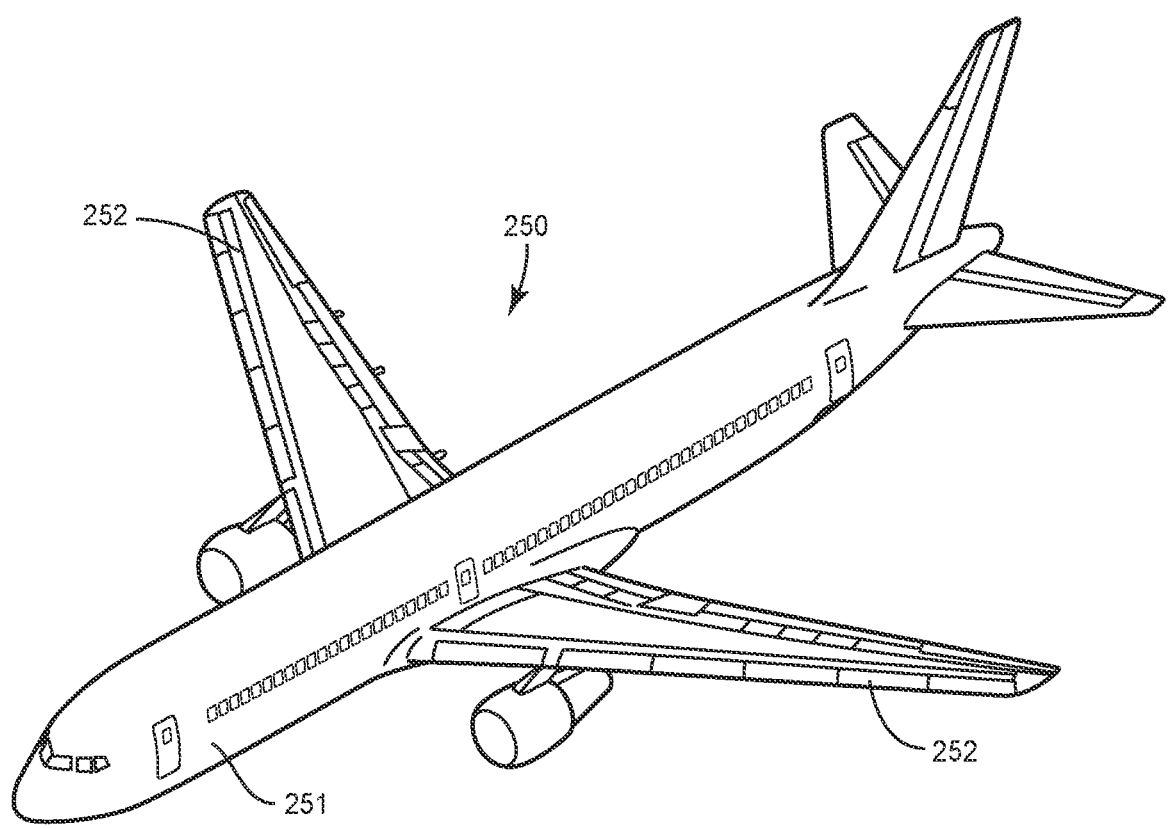
FIG. 20 is a schematic diagram of an aircraft that includes one or more composite members.

The systems 50 and methods can be used to manufacture a variety of different composite members 1000. One example is for various parts of a vehicle, such as an aircraft 250 as illustrated in FIG. 20. Examples include but are not limited to one or more parts of the fuselage 251 and wings 252.

Figure 21:
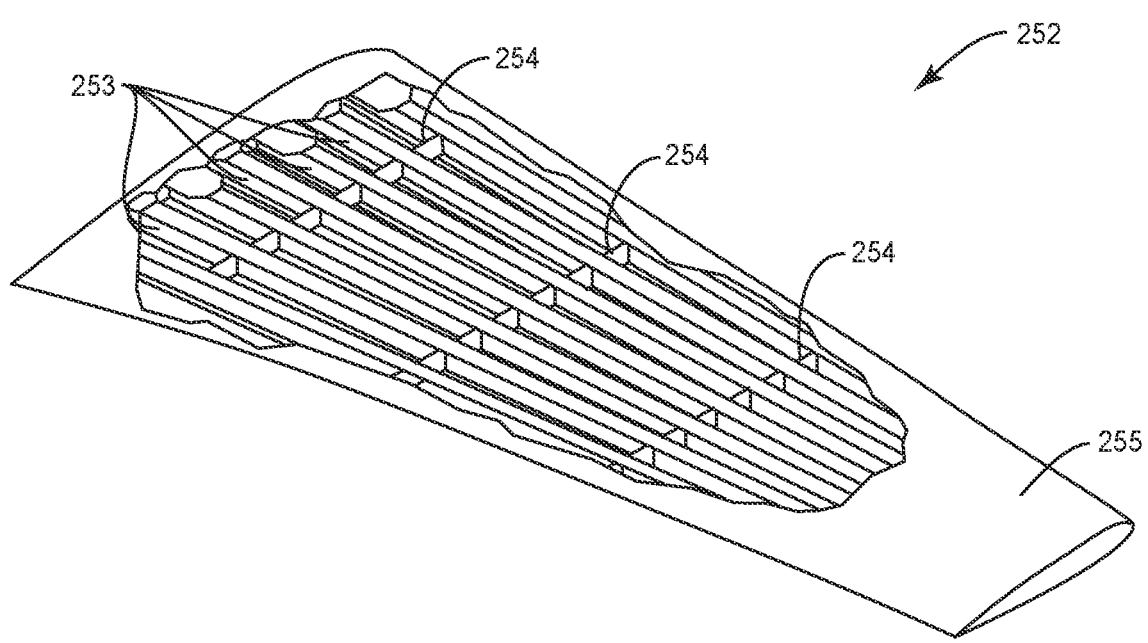
FIG. 21 is a perspective cut-away view of an interior of an aircraft wing.

In one specific aspect as illustrated in FIG. 21, the wing 252 include a plurality of wing stringers 742, which may extend along a length of the wing. The wing 252 can also include ribs, which also may be referred to herein as spars 254. The stringers 742 and spars 254 together can form and/or define at least a portion of an inner support structure for the wing 252, which may support an inner surface of skin segments 255. Composite members 1000 formed by the methods and systems disclosed herein can be used to manufacture one or more of the skin segments 255, stringers 253, and spars 254.

Various other types of vehicles that can include composite members 1000 include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of forming a composite member constructed from a plurality of composite plies, the method comprising:
   introducing first composite plies onto a conveyance member from a first supply station with the first supply station positioned at a first longitudinal end of the conveyance member and with a transfer station positioned at a second longitudinal end of the conveyance member positioned at a transfer station;
   introducing second composite plies onto the conveyance member from one or more second supply stations that are positioned away from the first supply station along one or both lateral sides of the conveyance member extending between the first longitudinal end and the second longitudinal end;
   orienting the first and second composite plies on the conveyance member;
   transferring the first composite plies and the second composite plies from the conveyance member to the transfer station that is positioned at the second longitudinal end of the conveyance member;
   individually transferring each of the first and second composite plies to a forming tool at the transfer station; and
   forming the first and second composite plies on the forming tool;
   the first composite plies comprising different design variables than the second composite plies, with the design variables comprising one or more of material, fiber orientation, and ply widths.

2. The method of claim 1, wherein orienting the first and second composite plies comprises transferring the first and second composite plies from the conveyance member onto a support surface of a first support member and individually orienting each of the first and second composite plies relative to one or more datums at the support member.

3. The method of claim 1, further comprising cutting one or more of the first and second composite plies on a first level and then vertically transferring the first and second composite plies to a second level prior to forming the composite plies on the forming tool.

4. The method of claim 1, further comprising cutting the first composite plies at the first supply station and cutting the second composite plies at the one or more second supply stations prior to introducing the respective first and second composite plies onto the conveyance member.

5. The method of claim 1, wherein the first composite plies introduced from the first supply station have a variety of different widths.

6. The method of claim 1, further comprising moving the forming tool and positioning each of the first and second composite plies at predetermined positions on the forming tool.

7. The method of claim 1, further comprising introducing a custom composite ply between adjacent ones of the first and second composite plies with the custom composite ply being a different type than either of the first and second composite plies.

8. The method of claim 1, further comprising individually orienting each of the first and second composite plies on a carrier medium and transferring each of the respective first and second composite plies to the forming tool while the respective first and second composite plies are supported by the carrier medium.

9. A method of forming a composite member constructed from a plurality of composite plies, the method comprising:
   introducing composite plies onto a conveyance member in a single-file predetermined order from a plurality of supply stations with the supply stations each supplying a different type of the composite plies and with a first of the supply stations positioned at a first end of the conveyance member and a plurality of second supply stations positioned along one or more lateral sides extending from the first end of the conveyance member;
   moving each of the composite plies along the conveyance member in the single-file predetermined order and to a predetermined position beyond a second end opposite to the first end of the conveyance member;
   individually orienting the composite plies relative to one or more datums at the predetermined position beyond the second end of the conveyance member;
   when each of the composite plies reaches the predetermined position beyond the second end of the conveyance member, transferring the composite plies to a forming tool that is located away from the conveyance member; and
   forming the composite plies on the forming tool;
   wherein the different types of composite plies comprise one or more different materials, fiber orientations, and ply widths.

10. The method of claim 9, further comprising introducing a first one of the composite plies that is a first type of composite ply from the first one of the supply station and introducing a second one of the composite plies that is a different second type of composite ply from a second one of the second supply stations that is located along the conveyance member downstream from the first supply station.

11. The method of claim 10, further comprising cutting each of the composite plies at the respective supply stations prior to introducing the composite plies onto the conveyance member with the first type of composite plies from a first one of the supply stations ply comprising a leading edge that is aligned at a different angle than the second type of composite plies from the second one of the supply stations ply.

12. The method of claim 10, further comprising moving each of the composite plies onto a support member located along the conveyance member downstream from the supply stations and individually orienting each of the composite plies on the support member prior to transferring the composite plies to the forming tool.

13. The method of claim 12, further comprising moving the support member to the forming tool while supporting the composite plies.

14. The method of claim 9, further comprising orienting each of the composite plies on the conveyance member prior to transferring the composite plies to the forming tool.

15. The method of claim 9, further comprising forming two or more of the composite plies into different widths at the respective supply station prior to introducing the two or more composite plies onto the conveyance member.

16. A method of forming a composite member constructed from a plurality of composite plies, the method comprising:
   introducing first composite plies onto a conveyance member from a first supply station with the first supply station positioned at a first longitudinal end of the conveyance member;
   introducing second composite plies onto the conveyance member from additional supply stations that are aligned on one or more lateral sides of the conveyance member at non-perpendicular orientations relative to the conveyance member, with the one or more lateral sides extending from the first longitudinal end of the conveyance member;

moving the first composite plies and the second composite plies along the conveyance member;
- transferring the first composite plies and the second composite plies from the conveyance member to a transfer station that is positioned at a second longitudinal end of the conveyance member;
- individually transferring each of the first and second composite plies to a forming tool at the transfer station; and
- forming the first and second composite plies on the forming tool;
- the first composite plies being comprising different design variables than the second composite plies with the design variables comprising one or more of material, fiber orientation, and ply widths.

17. The method of claim 16, further comprising moving the first composite plies and the second composite plies along the conveyance member directly towards the transfer station.

18. The method of claim 16, further comprising applying a vacuum and maintaining to maintain the first composite plies and the second composite plies on the conveyance member.

19. The method of claim 16, further comprising moving the first composite plies and the second composite plies directly from the conveyance member onto a support surface of the transfer station.

20. The method of claim 16, further comprising orienting the first and second composite plies on the conveyance member prior to moving to the transfer station.

* * * * *